United States Patent [19]

Petersen et al.

[11] 4,420,714
[45] Dec. 13, 1983

[54] APPARATUS FOR CONTINUOUSLY INCREMENTING AN OUTPUT MEMBER

[75] Inventors: Christian C. Petersen, Westwood; Bernard C. Westgate, Jr., Bradford, both of Mass.

[73] Assignee: Polaroid Corporation, Cambridge, Mass.

[21] Appl. No.: 308,151

[22] Filed: Oct. 2, 1981

[51] Int. Cl.³ .................. H02K 33/16; G03B 9/10
[52] U.S. Cl. ...................... 318/135; 310/37; 350/6.3; 354/234.1
[58] Field of Search .......... 354/195, 25, 234; 318/135, 121, 9; 350/6.3; 310/20, 22, 33, 37, 12, 80, 81

[56] References Cited

U.S. PATENT DOCUMENTS

| | | | |
|---|---|---|---|
| Re. 27,436 | 7/1972 | Sawyer | 346/29 |
| 451,320 | 4/1891 | Eickemeyer | 310/20 |
| 3,022,400 | 2/1962 | Von Ahlefeldt | 200/93 |
| 3,320,445 | 5/1967 | Bey | 310/20 |
| 3,351,789 | 11/1967 | Bertling | 310/37 |
| 3,452,259 | 6/1969 | Shtrikman et al. | 318/21 |
| 3,522,764 | 8/1970 | Biber et al. | 95/44 |
| 3,728,654 | 4/1973 | Tada | 335/234 |
| 3,735,231 | 5/1973 | Sawyer | 318/687 |
| 3,872,333 | 3/1975 | Imbert et al. | 310/27 |
| 3,882,522 | 5/1975 | Erlichman | 354/30 |
| 3,980,908 | 9/1976 | McClintock | 310/14 |
| 4,075,517 | 2/1978 | Adler | 310/13 |
| 4,149,792 | 4/1979 | Fraser et al. | 354/195 |
| 4,153,903 | 5/1979 | Pizzuti et al. | 354/195 |
| 4,199,244 | 4/1980 | Shenk | 354/195 |
| 4,235,153 | 11/1980 | Rinde et al. | 91/1 |
| 4,264,154 | 4/1981 | Petersen | 351/49 |
| 4,306,793 | 12/1981 | Date et al. | 354/152 |
| 4,306,798 | 12/1981 | Uchiyama et al. | 354/235 |
| 4,316,661 | 2/1982 | Saito | 354/234 |
| 4,333,722 | 6/1982 | Lee | 354/234 |
| 4,338,009 | 7/1982 | Lee | 354/152 |
| 4,343,239 | 8/1982 | Seifert | 101/93.34 |
| 4,348,092 | 9/1982 | Hirohata et al. | 354/230 |
| 4,348,094 | 9/1982 | Hirohata et al. | 354/234 |
| 4,349,264 | 9/1982 | Tezuka et al. | 354/234 |

*Primary Examiner*—J. V. Truhe
*Assistant Examiner*—A. Evans
*Attorney, Agent, or Firm*—Leslie J. Payne

[57] ABSTRACT

A motion producing apparatus is disclosed for moving an element, such as a lens element, along a given path. Included in the apparatus is a linear actuator having a pair of output members. The actuator is energizable for reciprocally moving in synchronism each of said output members in mutually opposite directions. Also provided is a mechanism for alternately coupling the output members to the movable lens element so as to progressively move the lens in a given direction along the given path.

15 Claims, 3 Drawing Figures

APPARATUS FOR CONTINUOUSLY INCREMENTING AN OUTPUT MEMBER

BACKGROUND OF THE INVENTION

In general this invention relates to actuators and, in particular, electromagnetic actuators operable for use in progressively driving a movable element along a given path.

In autofocusing systems a rangefinder device derives a signal that is a function of the subject-to-camera range. Such a signal drives a movable lens element of a lens assembly to a preselected focal position corresponding to the subject range. Examples of the foregoing systems are described generally in U.S. Pat. Nos. 3,522,764; 4,149,792; 4,153,903; and 4,199,244. Broadly, these patents describe analog components for driving the lens. For instance, the output of a rangefinder displaces a lens element through mechanical devices, such as a cam system, gear train, or an electrical device including a non-linear potentiometer for driving a conventional electric motor. One potential problem with analog drive components is that they do not precisely displace the lens element to the desired focal position.

One known approach for improving upon analog drive devices, in terms of accurately positioning a movable element, is with an electromagnetic stepper motor. These motors precisely increment displacement of an output member to precise positions. For instance, commonly assigned U.S. Pat. No. 3,882,522 discloses use of a rotary stepper motor for accurately controlling displacement of a shutter mechanism. However, stepper motors of the rotary type are not necessarily satisfactory under all circumstances. For instance, rotary stepper motors tend to be unsuitable for driving a lens element in an autofocusing system because they are relatively large and require relatively substantial amounts of power.

Linear motors, such as the kind described in commonly-assigned U.S. Pat. No. 4,264,154, have been proposed to rotationally incrementally drive an optical element for varying the transmissivity characteristics of sunglasses in accordance with ambient light. While such a linear motor serves admirably in the above circumstances, its potential use for rotationally displacing a lens element in an autofocusing system is somewhat limited. This is because it does not transmit motion during its return stroke. Thus, it lacks the speed necessary for displacing the lens element within the required time parameters of an autofocusing system.

SUMMARY OF THE INVENTION

It is an object of the present invention to provide an actuator which is an improvement over the types mentioned above. In that connection and in accordance with the present invention, there is provided an apparatus for use in moving an element along a given path. Included in this apparatus is a linear actuator having a pair of output members. The actuator is energizable for reciprocally moving, in synchronism, each of the output members in mutually opposite directions. In this apparatus there are means for alternately coupling the output members to the movable element so as to progressively move the element in a given direction along the given path.

In one embodiment, the linear actuator comprises a fixed armature assembly having means for producing a pair of spaced apart magnetic fields. Mounted in operative relation to the spaced apart magnetic fields is a pair of movable armature assemblies. Each of the movable armature assemblies carries one of the pairs of output members. Each of the movable armature assemblies has energizable means for producing a magnetic field cooperatively associated with respective ones of the spaced apart magnetic fields of the fixed assembly for synchronously moving the movable armature assemblies in mutually opposite directions, whereby upon energization of the energizable means, the output members move in mutually opposite directions.

In such embodiment, the coupling means are operable for alternately magnetically coupling each of the movable armature assemblies so as to alternately transmit motion of the movable armature assemblies to the movable element in one direction.

Among the objects of the invention are, therefore, the provision of an improved motion producing apparatus; the provision of a motion producing apparatus having an improved linear actuator with a pair of output members which are reciprocally movable in synchronism in mutually opposite directions; the provision of a motion producing apparatus of the type last noted having an improved coupling device which alternately magnetically couples different ones of the output members to a movable element so as to transmit motion thereto.

Other objects and further scope of applicability of the present invention will become apparent from the detailed description to follow when taken in conjunction with the accompanying drawings wherein like parts are designated by like reference numerals throughout the several views.

DETAILED DESCRIPTION

Figure 2:
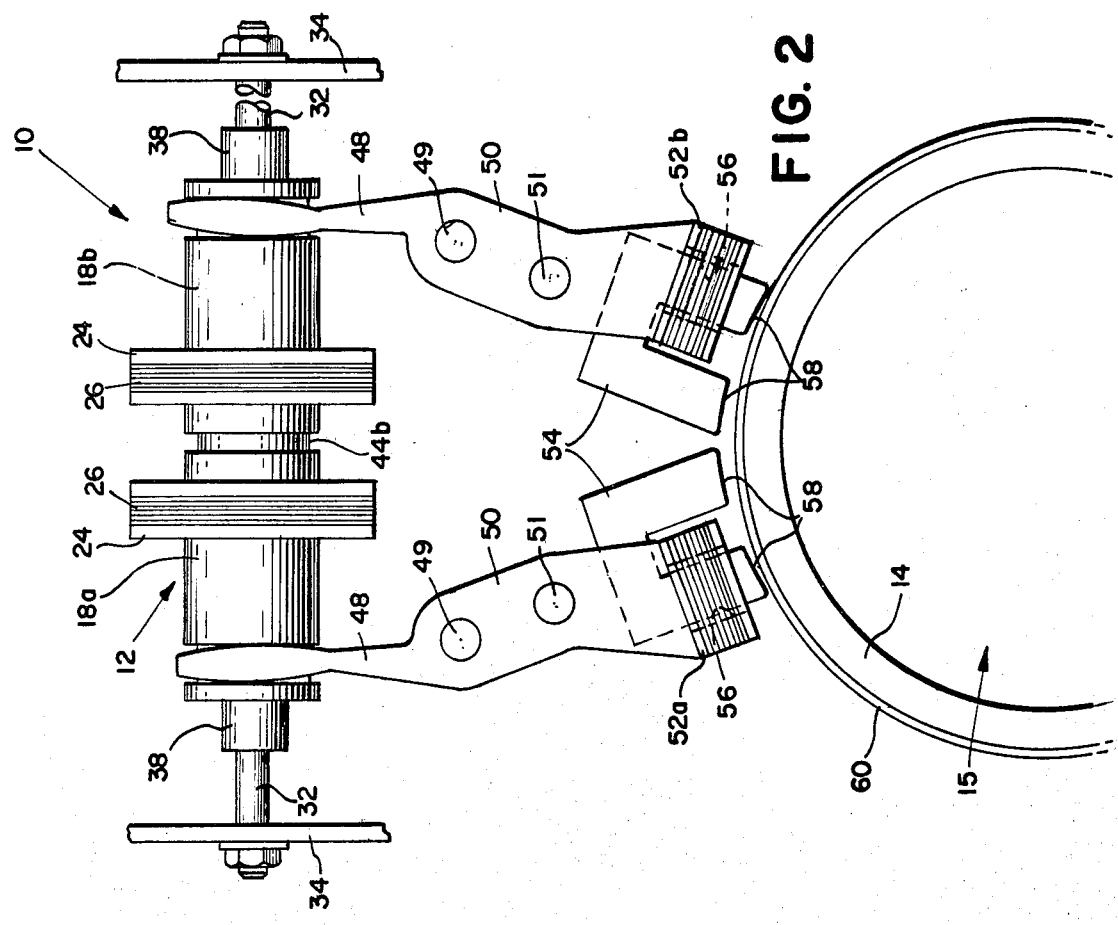
FIG. 2 is a view similar to FIG. 1, but showing the apparatus in another condition of operation.
Figure 1:
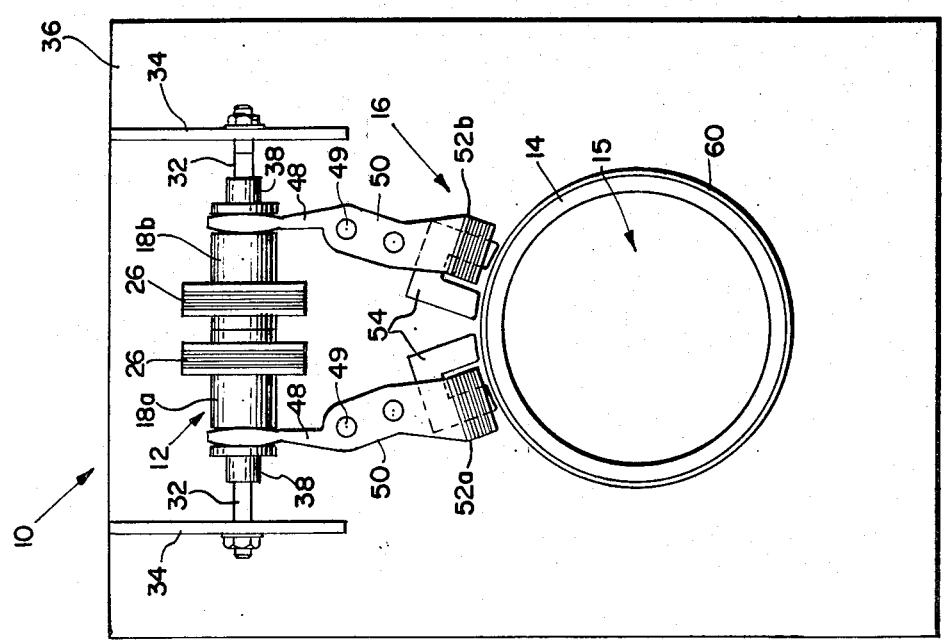
FIG. 1 is a front elevational view of the motion producing apparatus of the present invention in one condition of operation.

Reference is made to FIGS. 1 and 2 for illustrating a motion producing apparatus 10 of the present invention. Essentially, the motion producing apparatus 10 includes an improved linear actuator 12 which produces counter-reciprocating motion for rotationally driving a lens bezel 14 through a magnetic coupling mechanism 16. By reason of the foregoing arrangement, the lens bezel 14 can be quickly, continuously and, if desired, bidirectionally driven in precise incremental steps for precisely positioning the movable lens element (not shown) in the lens assembly 15 at a preselected focal position (not shown).

Figure 3:
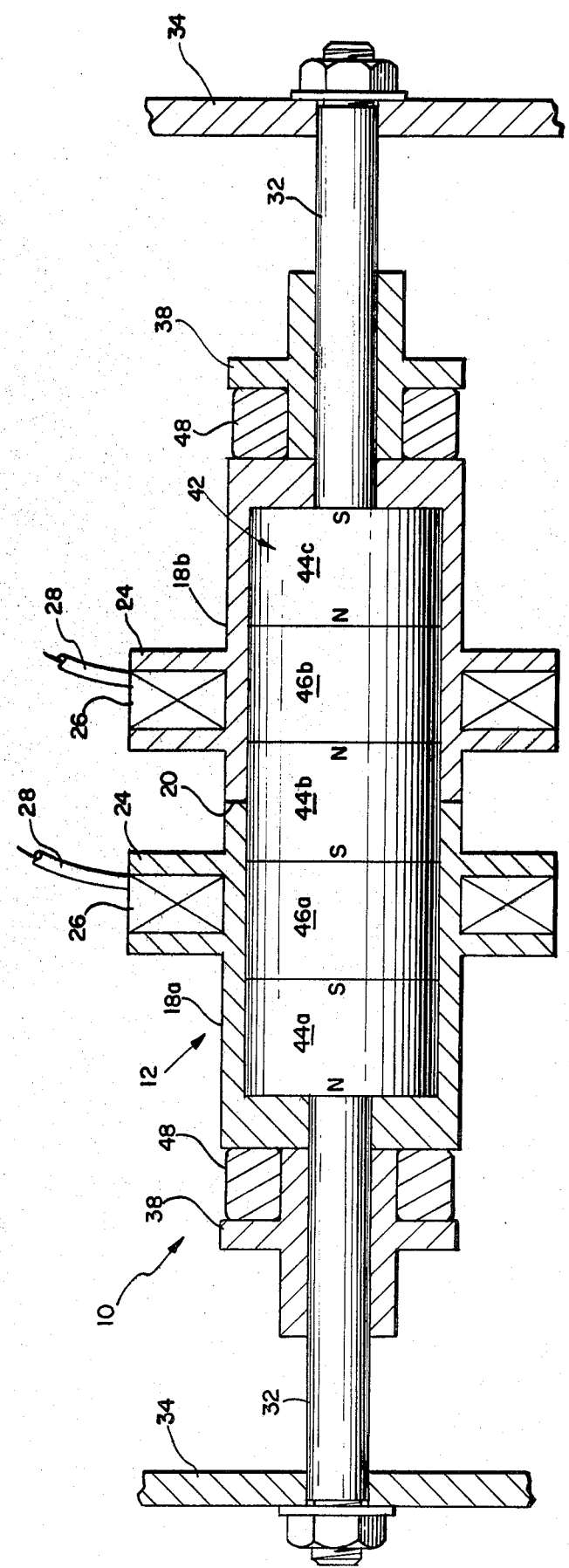
FIG. 3 is an enlarged view in cross-section of an improved linear actuator of the present invention.

Initial reference is made to FIG. 3 for showing a more detailed view of the improved linear actuator 12. Included in the linear actuator 12 is a pair of movable armature members 18a and 18b which are counter-reciprocally movable with respect to each other in mutually opposite directions. Each movable armature 18a, 18b is defined by a hollow open-ended cylinder made of a non-conducting, non-magnetic, material such as Delrin, sold by the E. I. duPont de Nemours and Company of Wilmington, Del. In a normal rest position, the armatures 18a, 18b abut each other, as at 20. Integrally formed on each of the movable armatures 18a and 18b is a bobbin 24. Mounted on the bobbins 24 are electrically conducting coils, schematically illustrated as at 26. It will be understood that the coils 26 are supplied with, preferably, a direct current source. An electrical lead 28 extends from each of the coils 26 and is suitably connected to a control mechanism. The latter is not shown insofar as it does not form part of the present invention. It is to be understood that a number of different control mechanisms can be used to operate the motion producing apparatus. Such a control mechanism simultaneously energizes both of the coils 26 as well as cyclically and simultaneously reverses the polarity of the current to each of the coils 26. The consequence of such cyclical and simultaneous reversals in the current to the coils 26 will be described presently. The coils 26 provide conductive means which produces a field that cooperates with the fields of the permanent magnets. Opposite ends of the armatures 18a, 18b have openings which allow the former to slide along supporting rods 32. These supporting rods 32 can be suitably threadedly connected to anchor plates 34 on a supporting block 36 located in and supported by a camera housing (not shown). Abutting each end of the armatures 18a, 18b is a yoke carrier 38 slidably mounted on a supporting rod 32. The yoke carriers 38 are suitably secured to the ends of the armatures 18a, 18b for conjoint rectilinear motion therewith.

Continued reference is made to FIG. 3 to show a fixed armature assembly 42. Included in this assembly 42 is a linear array of alternately fixed permanent magnets 44a-c and magnetically permeable core pieces 46a, 46b. This array is housed in slidable relationship to the movable armatures 18a, 18b. The end permanent magnets 44a, 44c are coupled to the supporting rods 32 at one end, while their opposite ends are magnetically coupled to core pieces 46a, 46b, respectively. As shown, the core pieces 46a, 46b are sandwiched between the permanent magnets. In this embodiment, the magnetically-permeable core pieces 46a, 46b are made of steel, while the permanent magnets are of the rare earth type and, preferably, samarium cobalt. The magnetically-permeable material of the core pieces 46a, 46b is preferably a soft magnetic material. By soft magnetic material it is meant that the material has low residual magnetism when a field imposed thereon is removed. In other words, the residual magnetism will be minimal upon removal of power. Of course, air may be used to define the core or even an isotropic magnetic material. Also, as noted, the south poles S of the permanent magnets 44a, 44b face each other, while the north poles N of the permanent magnets 44b, 44c face each other. As a consequence, each of the core pieces 46a, 46b have a circumferentially extending magnetic field extending generally transversely to the longitudinal axis of the armature assembly 42. The fields have south and north magnetic polarizations derived from their respective magnet pairs 44a, 44b; 44b, 44c. These transverse fields of the core pieces 46a, 46b encompass the coils 26 on the armatures 18a, 18b.

Reference is now made to FIG. 2 for better illustrating the magnetic coupling mechanism 16. Included in such mechanism 16 is yoke arm 48 pivotally mounted at 49 to the supporting block. One end of each yoke arm 48 is carried by a yoke carrier 38 so as to move in synchronism with the movable armatures 18a, 18b. Each of the yoke arms 48 is comprised of a pair of plates 50 (only one of which is shown) held together by pin 51. Attached to the bottom of the plates 50 are energizable coils 52a, 52b which are energized from a suitable direct current source and controlled by the same control mechanism indicated above which controls the coils 26. A generally U-shaped ferromagnetic, soft steel, bar 54 is coupled to each coil 52a, 52b. One leg of each pole piece 54 extends into a corresponding opening 56 of each of the coils 52a, 52b to form an electromagnetizable means for creating a field which interacts with the soft steel magnetically-permeable band 60 which acts as the keeper for the electromagnet. The coils 52a, 52b and bars 54 form coupling means for coupling movement of the armatures to the band 60. Both curved distal ends 58 of each pole piece are, preferably, in close proximity to the band 60. The band 60 is made of a soft magnetic material. Such material has low residual magnetic strength. Thus, when the power to the coils 52a, 52b ceases, there will be minimized magnetic strength in the band 60. Thus, there will be no traction forces on the band 60 exerted by either of the electromagnets which would be sufficient to cause rotation of the ring. Obviously, if there is relatively high residual magnetic strength in the bars 54 or the band 60, there would be a tendency for the bars 54 and band to remain coupled together. This would be undesirable. The latter being secured to the lens bezel 14 for rotational movement therewith.

It will be appreciated that whenever the coils 52a, 52b are energized, they will in conjunction with their associated pole piece 54 and the annular band 60 create magnetic circuits which magnetically couple the magnets 54 and thereby the yoke arm 48 to the band 60. In such a manner then, movement of the yoke arms 48 drives the band 60 and thereby the lens bezel 14. As will be explained more fully, the coils 52a, 52b are alternately energized in synchronism with the counter-reciprocating movement of the movable armatures 18a, 18b so as to continuously and incrementally transmit armature motion to the band 60 and thereby the lens bezel 14.

Operation of the motion producing apparatus 10 is described as follows. Simultaneous energization of the coils 26 with current of one polarity will create a pair of electromagnetic fields having generally equal strengths and the same sense of direction. Each of these fields interact respectively with the magnetic fields of core pieces 46a, 46b. Since the magnetic polarization of the pieces 46a, 46b are opposite, the electromagnetic fields of the coils 26 will create equal and opposing forces with the spaced pair of magnetic fields emanating from the core pieces 46a, 46b. These developed forces will drive the movable armature assemblies 18a, 18b mutually apart (see FIG. 2). Assume it is desired to rotate the lens bezel 14 in a clockwise fashion. For achieving this, the control mechanism energizes the leftmost coil 52a as the movable armatures 18a, 18b travel apart from their rest position. Thus, the coil 52a magnetically couples the yoke arm 48 to the band 60 on the lens bezel 14. Hence, motion of the movable armatures 18a will, through the pivotal yoke arm 48, cause incremental clockwise rotation of the lens bezel 14. It will be understood that while the coil 52a is energized, the coil 52b is deenergized.

Reversal of the current polarity through the coils 26 at the end of the strokes of the armatures 18a, 18b in the noted one direction, almost instantaneously creates electromagnetic fields having equal strengths, but opposite senses of direction. This new pair of electromagnetic fields interacts with the opposed pair of spaced fields of the core pieces 46a, 46b to almost instantaneously cause reversal in the direction of movement of the armatures 18a, 18b. In other words, the armatures 18a, 18b move mutually toward each other (i.e., toward the position shown in FIG. 1). During such armature reversal, the coil 52b is energized, while the coil 52a is deenergized. This magnetically couples the former to the band 60, while decoupling the latter from the band. Accordingly, the return stroke of the armature 18b leftwardly to its FIG. 1 position causes the rightmost yoke arm 48 to pivot and so move the coil 52b rightwardly. Since the coil 52b is energized, it will be effective to magnetically couple the movable armature 18b to the band 60. Thus, the lens bezel 14 will be driven in a clockwise direction.

Thus, through the incremental displacements of the armature assemblies 18a, 18b, the lens bezel 14 can be continuously displaced. To drive the lens bezel 14 in the opposite direction, the sequencing of energization of the field coils 52a, 52b in relationship to the mutual displacement of the armature assemblies 18a, 18b is reversed. Thus, when the armature assemblies 18a, 18b move apart, the coil 52b is energized while the coil 52a is deenergized. When the armatures move together, the coil 52a is energized and the coil 52b deenergized. Hence, the lens bezel 14 is incrementally driven in the counterclockwise direction.

Because of the precise control over the displacement of the armatures 18a, 18b such a system lends itself to be controlled by a digital control system, whereby precise lens positioning is obtainable. Moreover, there is no need, as with analog systems for an encoder wheel to accurately monitor the position of the lens. Also, the lens does not have to be returned to a park position after each focusing mode of operation. Moreover, the foregoing arrangement rapidly, conveniently and simply displaces a lens element with the proper speed necessary for autofocusing systems.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. Motion producing apparatus for moving an element along a given path, said apparatus comprising:
    a linear actuator having a pair of output members, said actuator being energizable for reciprocally moving in synchronism each of said output members in opposite directions; and
    means for alternately magnetically coupling said output members to said movable element so as to progressively move said element in a given direction along said given path.

2. The apparatus of claim 1 wherein said linear actuator comprises a fixed armature assembly having means for producing a pair of spaced apart magnetic fields, a pair of movable armature assemblies respectively mounted in operative relation to said spaced apart magnetic fields, each of said movable armature assemblies carrying one of said pair of output members, and each of said movable armature assemblies having energizable means for producing a magnetic field cooperatively associated with one of said spaced apart magnetic fields of said fixed assembly for synchronously moving said movable armature assemblies in opposite directions whereby upon energization of said energizable means, said output members move in opposite directions.

3. The apparatus of claim 1 wherein said linear actuator comprises a fixed armature assembly having a plurality of spaced apart permanent magnets arranged to provide a pair of spaced apart permanent magnetic fields, a pair of movable armature assemblies located alongside said fixed assembly in adjoining relation respectively to said spaced apart permanent magnetic fields, said pair of movable armature assemblies carrying a respective one of said pair of output members and respectively including electrically conductive means when energized for producing a magnetic field which is cooperative with the adjoining permanent magnetic field to displace said movable assemblies, and said electrically conductive means being interconnected so as to produce opposing displacement of said movable assemblies upon common energization with a given polarity thereof.

4. The apparatus of claim 3 wherein said conductive means in response to alternate reversal of the polarity of energization thereto provides reciprocal displacement of said movable assemblies, and said means for alternately coupling said output members to said movable element includes energizable means which is responsive to said alternate reversal of polarity.

5. Motion producing apparatus for moving an element along a given path, said apparatus comprising:
    a linear actuator having a pair of output members, said actuator being energizable for reciprocally moving in synchronism each of said output members in opposite directions; and
    said linear actuator comprises a fixed armature assembly having means for producing a pair of spaced apart magnetic fields, a pair of movable armature assemblies respectively mounted in operative relation to said spaced apart magnetic fields, each of said movable armature assemblies carrying one of said pair of output members, and each of said movable armature assemblies having energizable means for producing a magnetic field cooperatively associated with one of said spaced apart magnetic fields of said fixed assembly for synchronously moving said movable armature assemblies in opposite directions whereby upon energization of said energizable means, said output members move in opposite directions and means for alternately magnetically coupling said output members to a movable element so as to generally continuously increment the element.

6. The apparatus of claim 5 wherein said linear actuator comprises a fixed armature assembly having a plurality of spaced apart permanent magnets arranged to provide a pair of spaced apart permanent magnetic fields, a pair of movable armature assemblies located alongside said fixed assembly in adjoining relation respectively to said spaced apart permanent magnetic fields, said pair of movable armature assemblies carrying a respective one of said pair of output members and respectively including electrically conductive means when energized for producing a magnetic field which is cooperative with the adjoining permanent magnetic field to displace said movable assemblies, and said electrically conductive means being interconnected so as to produce opposing displacement of said movable assemblies upon common energization thereof.

7. The apparatus of claim 6 wherein said conductive means in response to alternate reversal of the polarity of energization thereto provides reciprocal displacement of said movable assemblies, and said means for alternately coupling said output members to said movable element is responsive to said alternate reversal of polarity.

8. Motion producing apparatus for use in moving a movable element along a given path in at least one of two opposite directions comprising:
magnetizable means connected to and movable with the movable element, said means when magnetized facilitating transmission of driving movement to the movable element;
first and second energizable means having respectively first and second armature assemblies for respectively reciprocatingly driving said first and second armature assemblies in mutually opposite directions; and
means operable for alternately magnetically coupling said first and second armature assemblies to said magnetizable means so as to alternately transmit motion of said first and second armature assemblies to the movable element so as to move said element in the one direction.

9. The apparatus of claim 8 wherein said first and second armature assemblies are arranged with respect to each other so that they move mutually towards each other during one operational mode and mutually away from each other during another operational mode, said coupling means being operable for coupling said first armature to said magnetizable means during the one mode and for alternately coupling said second armature to said magnetizable means during the other mode, said magnetizable means having relatively low residual magnetism so as to allow decoupling by said coupling means when inoperable.

10. The apparatus of claim 9 wherein said coupling means is operable to drive the movable element in the opposite direction by reversing the sequencing of the alternate coupling of said first and second armature assemblies to said magnetizable means so that when said armature assemblies are moving in the one mode said coupling means couples said first armature assembly to said magnetizable means and when said armature assemblies are moving in the other mode said coupling means couples said second armature assembly to said magnetizable means.

11. The apparatus of claim 10 wherein said coupling means includes first and second electromagnetizable means which when energized respectively magnetically couple said first and second armature assemblies to said magnetizable means.

12. The apparatus of claim 9 wherein each of said first and second armature assemblies includes a longitudinally movable armature having a coil wrapped thereabout, said coils being simultaneously and cyclically energizable by reversals in current for producing electromagnetic fields, whose sense of direction reverses with the polarity reversals, a fixed assembly having a pair of spaced apart permanent magnetic fields and extending in a manner and direction so that each field interacts with a corresponding one of said fields of said coils, whereby when said coils have one polarity said assemblies move in the one mode and when said coils have the other polarity said assemblies move in the other mode.

13. Motion producing apparatus for use in moving a movable element to a plurality of positions along a given path in at least one of two opposite directions comprising:

means connected to and movable with the movable element and being magnetizable for facilitating magnetic coupling allowing transmission of driving movement to the movable element so as to move the element, said magnetizable means having relatively low residual magnetism so as to allow magnetic decoupling;
first and second linear motor means electrically energizable respectively for providing driving forces, each of said first and second motor means including respective first and second armature assemblies each of said assemblies being arranged so that when respective ones of said motor means are energized, said first and second armature assemblies mutually drivingly move toward each other in one mode of operation and away from each other in another mode of operation, wherein the different modes of operation correspond to mutually opposing electrical current polarities flowing through respective ones of said first and second motor means;
first and second electromagnetizable means selectively and alternatively energizable for automatically magnetically coupling respective ones of said first and second armature assemblies to said magnetizable means and allowing decoupling with said magnetizable means when unenergized; and
means controllable for energizing one of said first and second electromagnetizable means during said one mode of operation of said armatures to thereby drive the element in one direction and for alternating energizing the other one of said first and second electromagnetizable means during the other mode of operation of said armatures to thereby drive the element in the one direction, said controllable means being energizable for reversing the sequencing of alternate energization of said first and second electromagnetizable means as the modes of operation of said first and second armature assemblies are reversed so that the other of said electromagnetizable means is energized during the one mode of operation of said armatures so as to drive the element in the opposite direction and the one of said electromagnetizable means is energized during the other mode of operation so as to drive the element in the opposite direction.

14. In a motion producing apparatus for continuously incrementally moving a movable output member along a given path in selectively opposite directions comprising:
means connected to and movable with said movable member and being magnetizable for facilitating magnetic coupling allowing transmission of driving movement to the movable member so as to move the member, said magnetizable means having relatively low residual magnetism so as to allow magnetic decoupling;
first and second linear motor means energizable for providing driving forces in opposite directions along given paths, said first and second motor means respectively including first and second armature assemblies, each of said first and second armature assemblies being movable in discrete increments in opposite directions along the given paths in response to energization of respective ones of said first and second motor means;
said first and second motor means are positioned so that respective ones of said first and second armature assemblies can generally simultaneously mutually move together when said first and second motor means are energized with the same electrical polarity and said first and second armature assemblies can generally simultaneously move apart when energized with the opposite electrical polarity; and first and second electromagnetizable means energizable for alternately magnetically coupling a respective one of said first and second armature assemblies to said magnetizable means during at least a portion of the movement of respective ones of said first and second armature assemblies relatively toward each other so as to incrementally drive said magnetizable means and thereby the movable member in one direction in response to incremental movement of a respective one of said first and second armatures and the other respective one of said first and second electromagnetizable means being alternately energized for magnetically coupling the other of said first and second assemblies to said magnetizable means during at least a portion of the movement of respective ones of said first and second armature assemblies relatively away from each other so as to incrementally drive said magnetizable means and thereby the movable member in the one direction, said first and second electromagnetizable means allowing decoupling with said magnetizable means when unenergized.

15. The apparatus of claim 14 wherein said first and second electromagnetizable means are pivotally mounted to said apparatus and are mechanically coupled to one end portion to respective ones of said first and second armature assemblies and the other end portions of respective ones of said first and second electromagnetizable means are positioned adjacent to said magnetizable means, whereby when said first and second motor means have been energized to move said first and second armature assemblies mutually towards each other, the one of said first and second electromagnetizable means is energized to magnetically couple movement of one of said first and second armature assemblies to said magnetizable means so as to drive the movable member in one direction of movement, and when said first and second motor means have been energized to move said first and second armature assemblies mutually apart from each other, the other one of said first and second electromagnetizable means is energized to magnetically couple movement of the other one of said first and second armature assemblies to said magnetizable means so as to drive the movable member in one direction of movement.

* * * * *